United States Patent
Yang et al.

(10) Patent No.: US 12,546,074 B2
(45) Date of Patent: Feb. 10, 2026

(54) ELECTRIC DEFROSTER

(71) Applicants: You Yang, Zhejiang (CN); Hu Lu, Zhejiang (CN)

(72) Inventors: You Yang, Zhejiang (CN); Hu Lu, Zhejiang (CN)

( * ) Notice: Subject to any disclaimer, the term of this patent is extended or adjusted under 35 U.S.C. 154(b) by 345 days.

(21) Appl. No.: 18/352,539

(22) Filed: Jul. 14, 2023

(65) Prior Publication Data
US 2024/0026621 A1    Jan. 25, 2024

(30) Foreign Application Priority Data
Jul. 22, 2022 (CN) .......................... 202221916978.9

(51) Int. Cl.
| | |
|---|---|
| *E01H 5/12* | (2006.01) |
| *B60S 1/34* | (2006.01) |
| *B60S 3/04* | (2006.01) |

(52) U.S. Cl.
CPC ........ *E01H 5/12* (2013.01); *B60S 1/34* (2013.01); *B60S 3/045* (2013.01)

(58) Field of Classification Search
CPC .......... B60S 1/36; B60S 1/3486; B60S 3/045; B60S 1/32; E01H 5/12
See application file for complete search history.

(56) References Cited

U.S. PATENT DOCUMENTS

| | | | | |
|---|---|---|---|---|
| 4,255,880 | A * | 3/1981 | McMickle | E01H 5/04 37/285 |
| 4,745,653 | A * | 5/1988 | Bliznak | B60S 1/524 15/250.4 |
| 6,763,546 | B1 * | 7/2004 | Smith | B60S 1/38 15/250.04 |
| 7,302,732 | B2 * | 12/2007 | Alley | B60S 1/42 15/250.4 |
| 7,526,831 | B2 * | 5/2009 | Weinberger | A47L 13/022 15/236.08 |
| 8,281,454 | B1 * | 10/2012 | Jordan | B60S 1/3801 15/250.4 |
| 11,820,335 | B1 * | 11/2023 | Roberts | B60S 1/3486 |
| 2013/0180544 | A1 * | 7/2013 | Nelson | B60S 1/3801 15/250.04 |
| 2018/0201235 | A1 * | 7/2018 | Klier | A47L 1/13 |
| 2018/0244246 | A1 * | 8/2018 | Giwa | A47L 1/16 |
| 2022/0330766 | A1 * | 10/2022 | Long | A47L 1/16 |

* cited by examiner

*Primary Examiner* — Michael D Jennings

(57) ABSTRACT

The invention discloses an electric defroster, comprising a housing with a handle; a working wheel rotatably connected with housing and at least partially protrudes out of the surface of the housing, scraping pieces extending along the axial direction is arranged on the surface of the working wheel, and a power mechanism used for driving the working wheel to rotate relative to the housing; scraping pieces rotate in the circumferential direction to scrape ice. The invention utilizes the working wheel to roll and deice the glass surface, the flexibility of the position for scraping ice is higher and ice at the corner can be effectively scraped; there are more contact surface can be selected, ice scraping more flexible; scraped ice is quickly discharged from space between adjacent scraping pieces, ensuring ice scraping efficiency; the invention can not only be used for scraping ice, but also for cleaning and removing rust.

9 Claims, 8 Drawing Sheets

ELECTRIC DEFROSTER

1. TECHNICAL FIELD

The invention belongs to the technical field of deicing tools, and particularly relates to an electric defroster.

2. BACKGROUND ART

When the temperature is lower in winter, the automobile glass, the sentry glass observation window and the like are prone to freeze or form frost, influencing normal use of automobiles. In order to remove the ice, silicone scraper or hard utensil is usually adopted for manual scraping, the efficiency of which is low and unable to completely scraping the ice; besides, it is difficult to control the scraping strength as too light strength is difficult to scrap the ice and too strong force tends to scratch the glass, wasting time and labor.

3. SUMMARY OF THE INVENTION

In order to overcome shortcomings in prior art, the invention provides an electric defroster with convenience, high efficiency, and wide applicability.

The technical scheme adopted by the invention is an electric defroster, comprising
- a housing with a handle;
- a working wheel rotatably connected with the housing and at least partially protrudes out of the surface of the housing, scraping pieces extending along the axial direction is arranged on the surface of the working wheel;
- a power mechanism is used for driving the working wheel to rotate relative to the housing;
- the power mechanism drives the working wheel to rotate relative to the housing; the scraping pieces rotate in the circumferential direction to scrape ice.

The invention utilizes the working wheel to roll and deice the glass surface; compared with scraping ice with whole bottom surface stick to the glass surface, the flexibility of the position for scraping ice of the invention is higher and the ice at the corner can be effectively scraped; the scraped ice is discharged outward rather than in all directions and does not adversely affect continuous scraping; in addition, the working wheel can contact with the glass surface line to scrape ice with smaller contact area, or there are more contact surface can be selected, which makes ice scraping more flexible.

Furthermore, the working wheel is cylindrical, and the scraping pieces protrude outwards from the surface of the working wheel. The working wheel is cylindrical, and the ice can be uniformly scraped at the periphery after rolling; the scraping pieces protrude from the surface of the working wheel, so that the scraping efficiency for freezing is higher.

Furthermore, there are a plurality of scraping pieces extend spirally, and are distributed at intervals along the circumferential direction of the working wheel. The spiral design ensures that the working wheel can realize ice scraping not necessarily being contacted with the surface of the glass in the whole axial direction, and only the working wheel partially contacted with the glass can realize ice scraping, so it is more flexible in use; the scraped ice is quickly discharged from the space between the adjacent scraping pieces, ensuring the ice scraping efficiency.

Furthermore, the height of the scraping pieces protruding from the surface of the working wheel is gradually increased along the direction in which the wheel is rotated, avoiding the ice being accumulated between the adjacent scraping pieces, meanwhile, the protruding height of the contact point between the scraping piece and the glass surface can be increased, thus having better ice scraping effect is and the ice scraping operation is more labor-saving.

Furthermore, the power mechanism comprises a power source, a speed reduction unit connected with the output shaft of the power source, and a conveyor belt connected with the speed reduction unit and the working wheel. The load for the conveyor belt is great, even slipping happens in the course of the work, which can not lead to the damage of power source, and further extend power mechanism's using life.

Furthermore, the speed reduction unit comprises the first speed reduction gear and the second speed reduction gear which are in meshing transmission; the power source is a motor which is arranged in parallel with the working wheel. The layout is reasonable, and the output efficiency of the power source is more matched with the rotating speed of the working wheel.

Furthermore, tooth is provided on the rotation shaft of working wheel, said first speed reduction gear is coaxially provided with a first auxiliary gear, said second speed reduction gear is coaxially provided with a second auxiliary gear, wherein said first auxiliary gear is in mesh transmission with the second speed reduction gear, and said second auxiliary gear and the tooth are connected by conveyor belt.

Furthermore, on said housing is provided with a protective cover at the position corresponding to the working wheel; on said housing is provided with an auxiliary illuminating lamp. The protective cover guides the scraped object in the target direction and avoids injury to the user due to splashing of the ice removed by rolling of the scraping piece; the auxiliary illuminating lamp is convenient for use at night.

Furthermore, said housing is connected to an extension bar, said handle is connected to the end of the extension bar, which is convenient for deicing at high or distant place and more flexible in use.

Furthermore, said working wheel is covered with a working layer on the outside. The working layer can be used for sticking hair, or for cleaning, or for removing rust, or for polishing.

The advantageous effects obtained by the invention is as follow: the invention utilizes the working wheel to roll and deice the glass surface, the flexibility of the position for scraping ice is higher and the ice at the corner can be effectively scraped; there are more contact surface can be selected, which makes ice scraping more flexible; the scraped ice is quickly discharged from the space between the adjacent scraping pieces, ensuring the ice scraping efficiency; the invention can not only be used for scraping ice, but also can be used for cleaning and removing rust.

4. BRIEF DESCRIPTION OF ACCOMPANY DRAWINGS

5. SPECIFIC EMBODIMENT OF THE INVENTION

In order to make those skilled in the art understand the scheme of the invention more clearly, the technical scheme of the invention is further described clearly and detailedly hereinafter with reference to the drawings. Obviously, only partial embodiments of the invention are shown and the actual structure is not limited thereto. All other embodiments, which can be obtained by those skilled in the art without making any creative effort based on the embodiments in the invention, shall all fall within the protective scope of the invention.

Embodiment 1

As shown from FIG. 1 to FIG. 10, an electric defroster a housing 1 with a handle 11; a working wheel 2 rotatably connected with the housing 1 and a power mechanism 3 used for driving the working wheel 2 to rotate relative to the housing 1.

Figure 1:
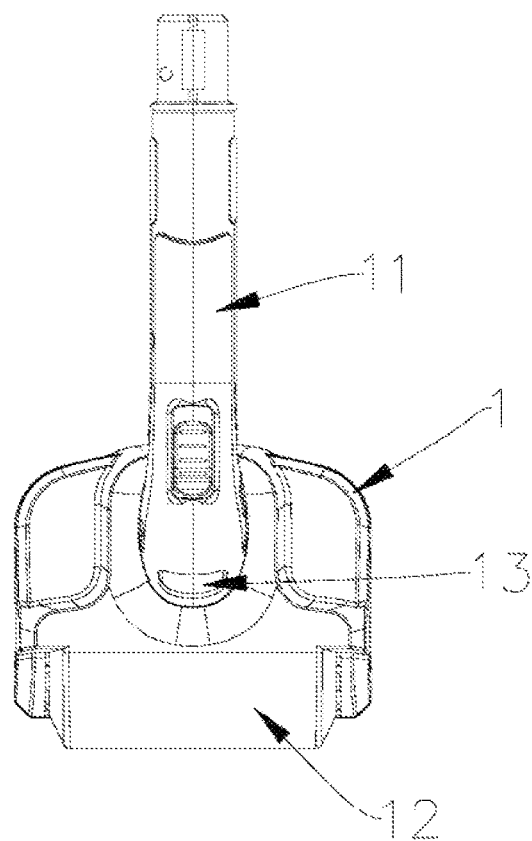
FIG. 1 is the main view of the embodiment 1 provided by the invention.
Figure 2:
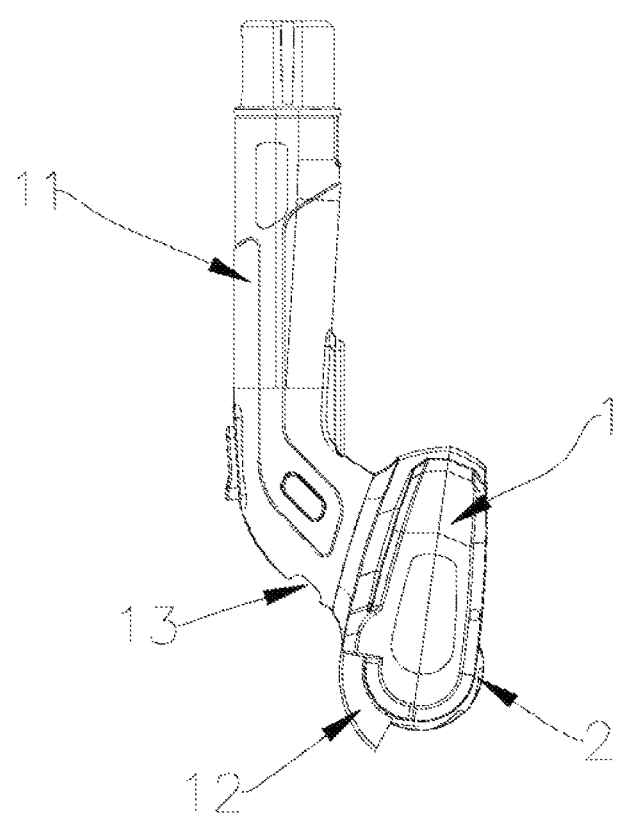
FIG. 2 is the side view of the embodiment 1 provided by the invention.
Figure 3:
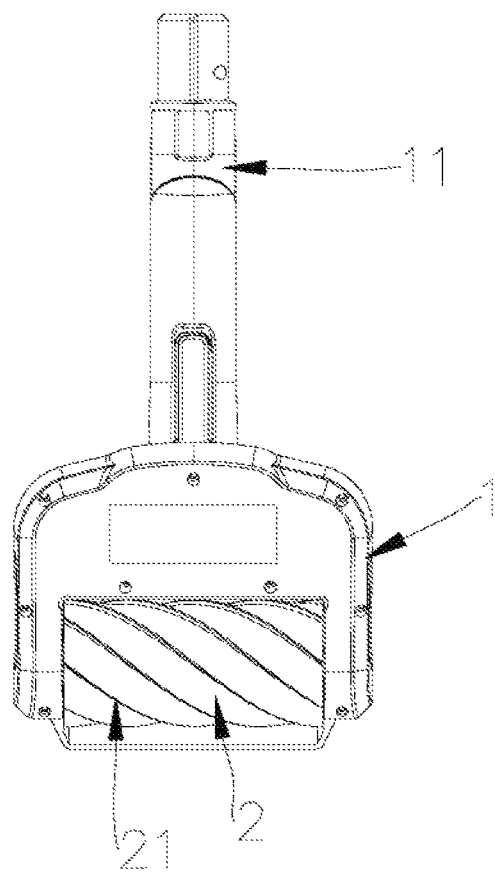
FIG. 3 is the rear view of the embodiment 1 provided by the invention.
Figure 4:
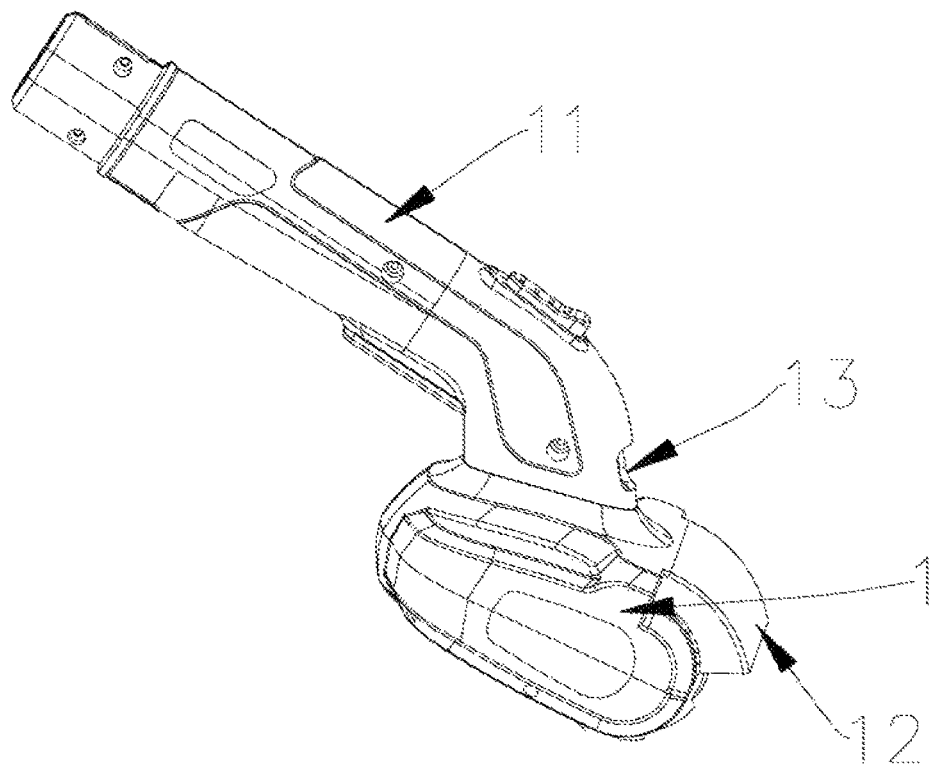
FIG. 4 is the stereogram of the embodiment 1 provided by the invention.
Figure 5:
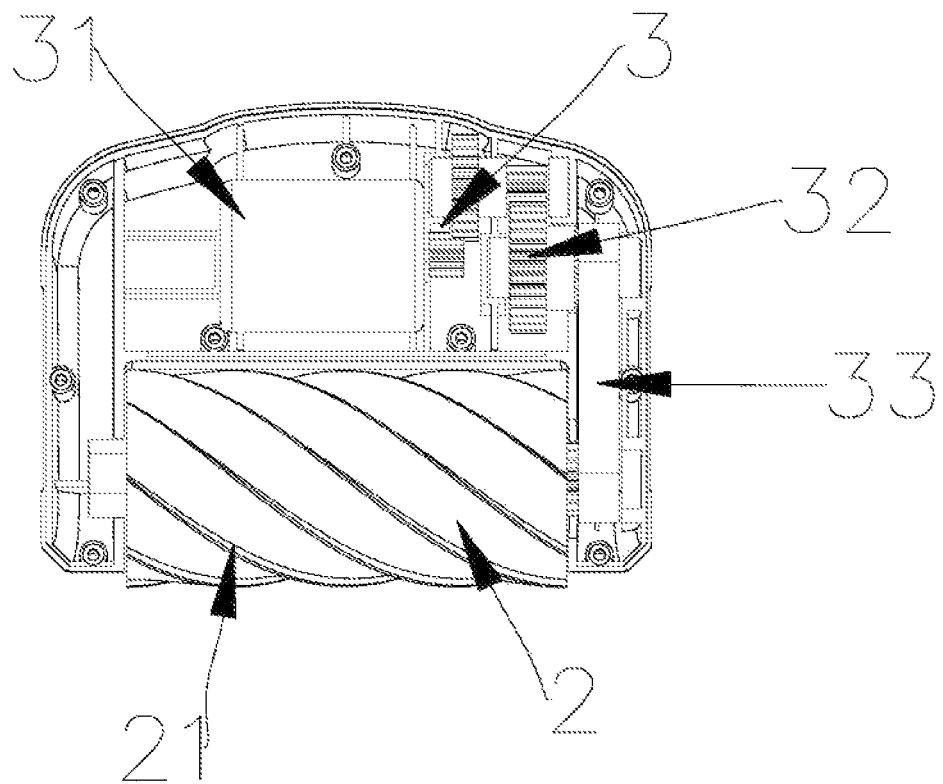
FIG. 5 is the main view of the housing interior structure in embodiment 1 provided by the invention.
Figure 6:
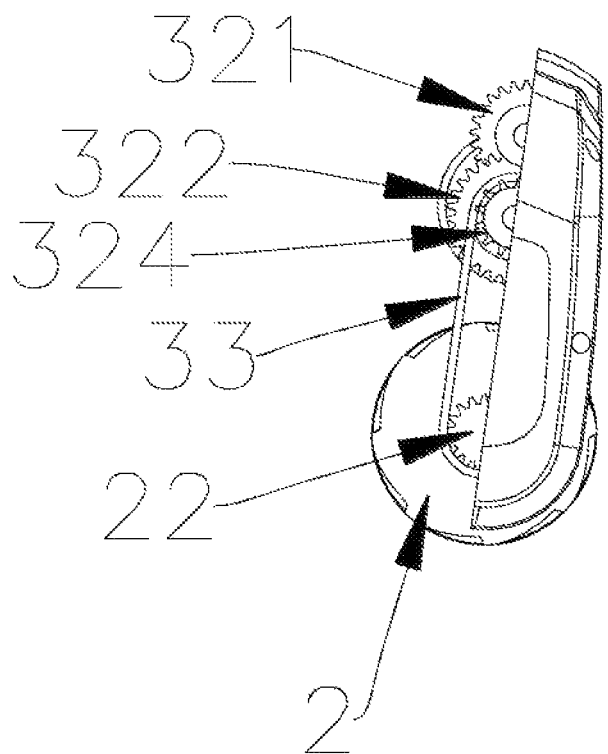
FIG. 6 is the side view of the housing interior structure in embodiment 1 provided by the invention.
Figure 7:
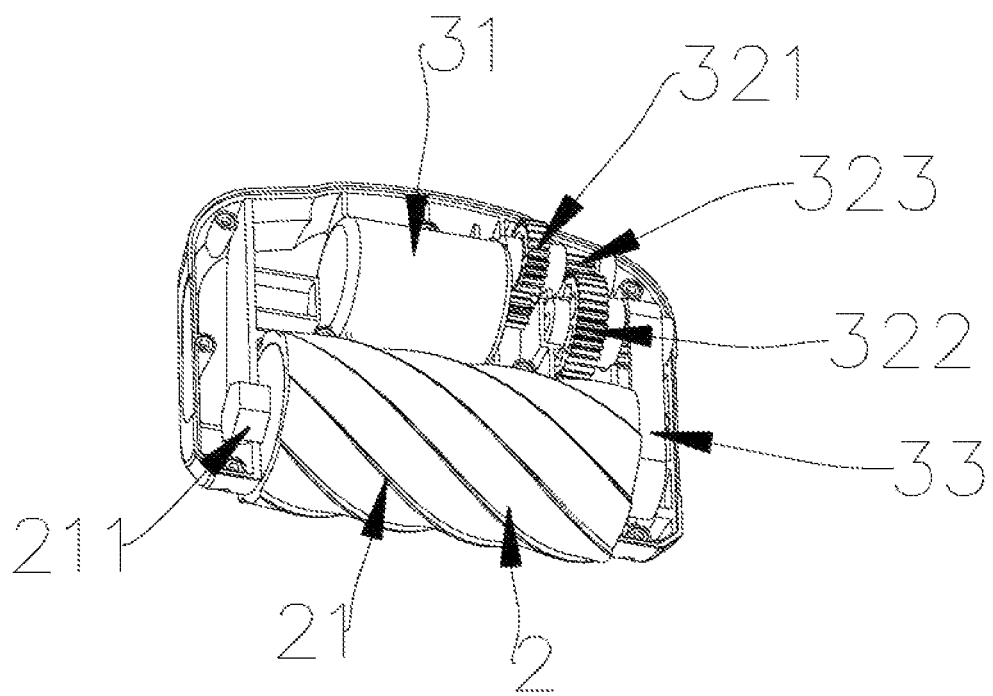
FIG. 7 is the stereogram of the housing interior structure in embodiment 1 provided by the invention.

As shown in FIG. 2, at least partial of the working wheel 2 protrudes out of the surface of the housing 1, scraping pieces 21 extending along the axial direction are arranged on the surface of the working wheel 2; the power mechanism drives the working wheel 2 to rotate relative to the housing 1; the working wheel 2 rotates circumferentially relative to its own rotating shaft 211, thus driving the scraping pieces 21 to rotate in the circumferential direction, which can be used to scrape ice when the rotating scraping pieces 21 come into contact with the ice on the windows, etc.

Figure 8:
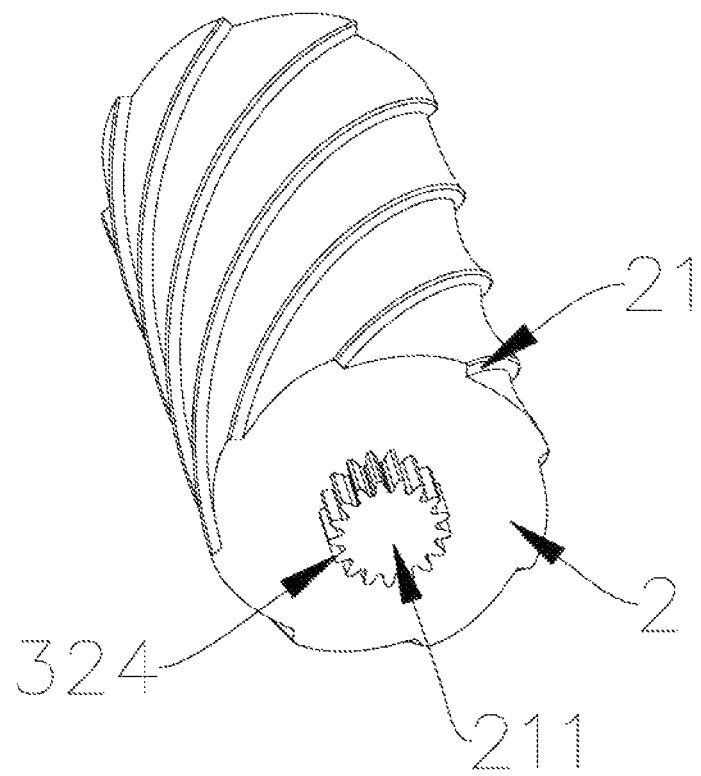
FIG. 8 is the stereogram of the working wheel of the invention.
Figure 9:
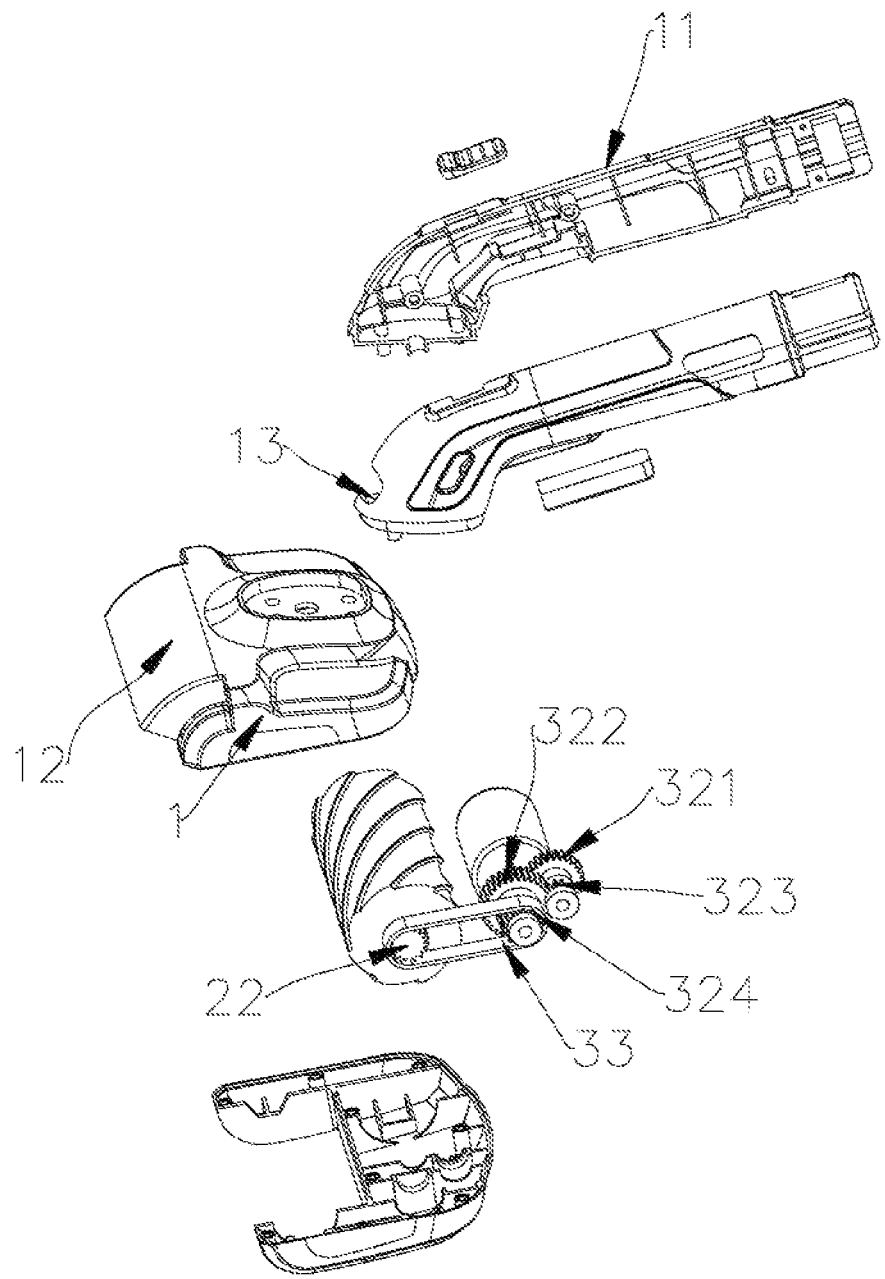
FIG. 9 is the first breakdown structure diagram in embodiment 1 provided by the invention.
Figure 10:
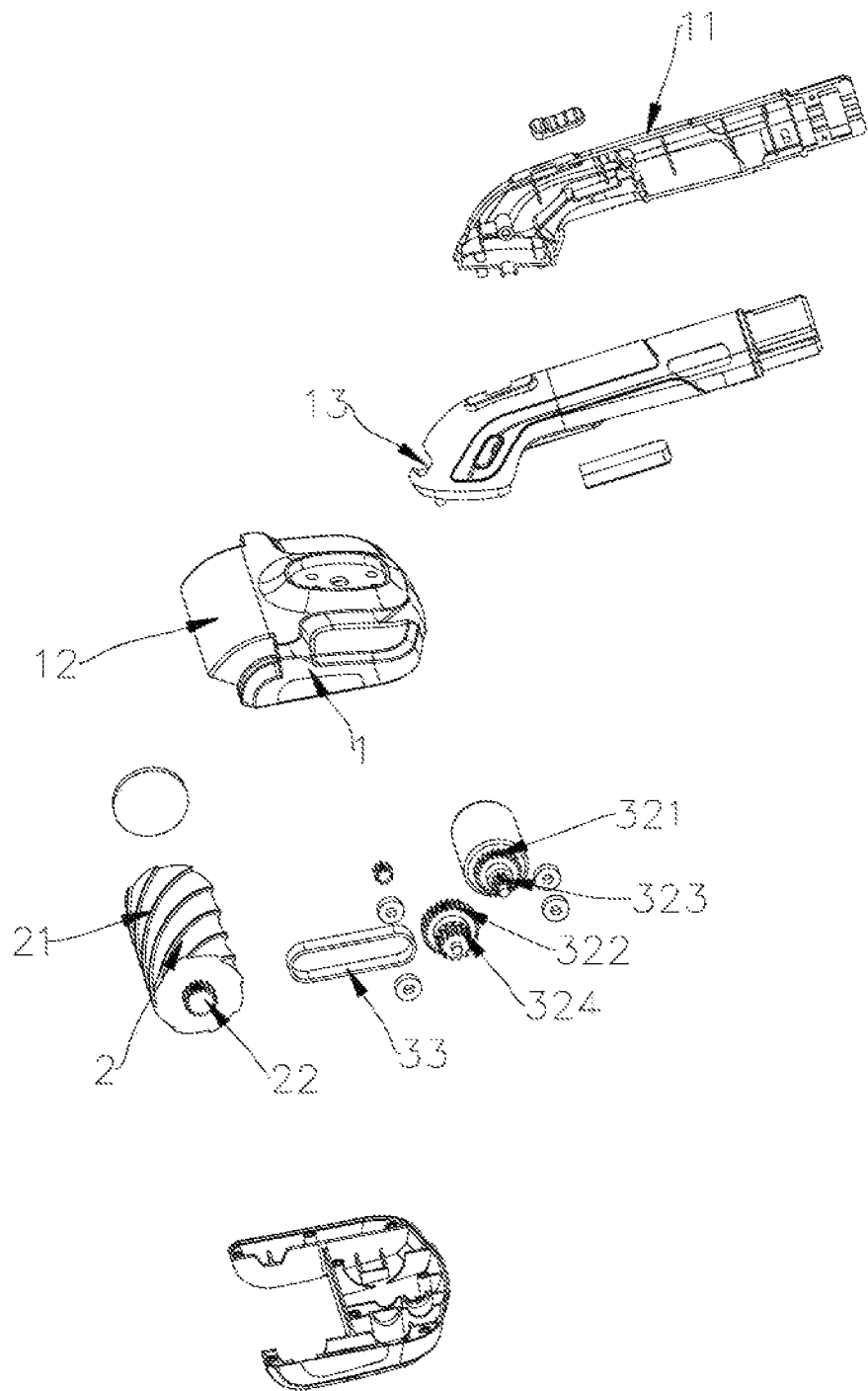
FIG. 10 is the second breakdown structure diagram in embodiment 1 provided by the invention.
Figure 11:
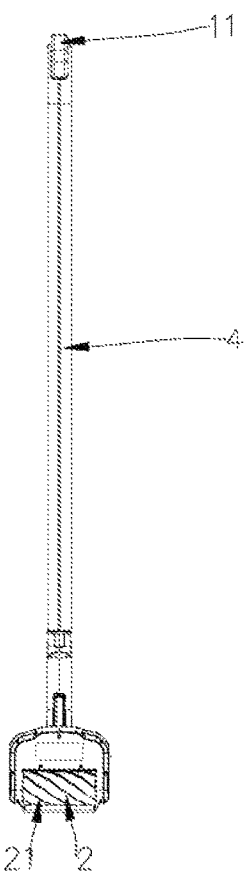
FIG. 11 is the rear view of the embodiment 2 provided by the invention.
Figure 12:
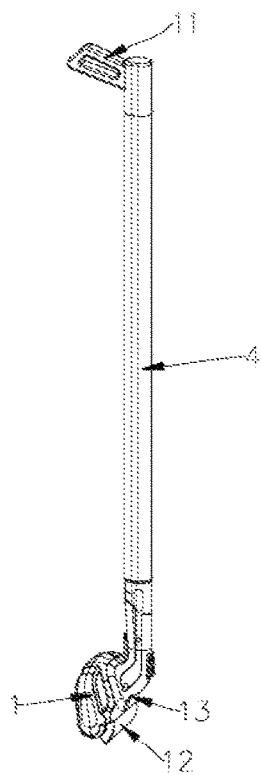
FIG. 12 is the stereogram of the embodiment 2 provided by the invention.
Figure 13:
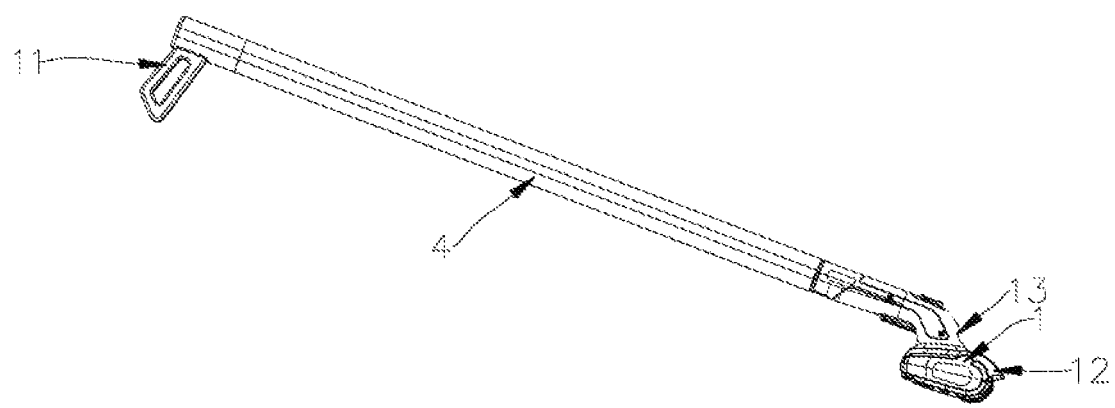
FIG. 13 is the side view of the embodiment 2 provided by the invention.

As shown from FIG. 8 to FIG. 10, the working wheel 2 is cylindrical, and the scraping pieces 21 protrude outwards from the surface of the working wheel 2. More specifically, there are a plurality of scraping pieces 21 extend spirally, and are distributed at intervals along the circumferential direction of the working wheel 2. The spiral extension design of the scraping pieces 21 makes the scraped ice quickly discharged from the space between the adjacent scraping pieces 21, ensuring the ice scraping efficiency; and the spiral design ensures that the working wheel 2 can realize ice scraping not necessarily being contacted with the surface of the glass in the whole axial direction, and only the working wheel 2 partially contacted with the glass can realize ice scraping, so it is more flexible in use.

Certainly, in other embodiments, the scraping pieces 21 can extend along the The scrapers 21 may also extend along the axial direction of the working wheel 2 in a straight line, or in a wavy line, or in a diagonal line, without limitation.

More specifically, the protruding height of the scraping pieces 21 from the surface of the working wheel 2 is not equal everywhere, but increases gradually in the rotation direction of the working wheel 2. As an example, in the direction shown in FIG. 8, the working wheel 2 rotates clockwise during operation, and the height of the scraping pieces 21 increases gradually in the clockwise direction. In other words, the scraping piece 21 are shortest at the starting end of protrusion on the working wheel 2 and increase in height as they extend in the circumferential direction. Said structure can not only improve the deicing effect, but also avoiding the ice being accumulated between the adjacent scraping pieces 21.

In order to avoid injury to the user due to splashing of the ice removed by rolling of the scraping pieces 21, on said housing 1 is provided with a protective cover 12 at the position corresponding to the working wheel 2, which can guide the scraped object in the target direction and discharge.

With the aim of facilitating using at night, on said housing is provided with an auxiliary illuminating lamp 13, which is arranged between the working wheel 2 and the handle 1, and the illumination direction is toward the working wheel 2.

As shown from FIG. 5 to FIG. 7, FIG. 9, and FIG. 10, the power mechanism 3 comprises a power source 31, a speed reduction unit 32 connected with the output shaft of the power source 31, and a conveyor belt 33 connected with the speed reduction unit 32 and the working wheel 2. In the embodiment, the power source 31 is a motor. To save space and reduce the volume of housing 1, and make the layout more reasonable, the power source 31 is arranged in parallel with the working wheel 2. It is certainly that the power source 31 can be accumulators, external power source and other structures, without limitation.

Furthermore, the speed reduction unit 32 comprises the first speed reduction gear 321 and the second speed reduction gear 322 which are in meshing transmission; the power source is a motor which is arranged in parallel with the working wheel. Tooth 22 is provided on the rotation shaft of working wheel 2, said first speed reduction gear 321 is coaxially provided with a first auxiliary gear 323 and the external diameter of the first auxiliary gear 323 is smaller than that of the first speed reduction gear 321; said second speed reduction gear 322 is coaxially provided with a second auxiliary gear 324 and the external diameter of the second auxiliary gear 324 is smaller than that of the second speed reduction gear 322; the first speed reduction gear 321 is in mesh transmission with the second speed reduction gear 322, the first auxiliary gear 323 is in mesh transmission with the second speed reduction gear 322, and said second auxiliary gear 324 and the tooth 22 are connected by conveyor belt 33. the structure makes the output efficiency of the power source 31 more matched with the rotating speed of the working wheel 2. The layout of conveyor belt 33, power source 31, working wheel 2 relative to the housing 1 is more reasonable; the conveyor belt adopts leather belt and the load thereof is great, even slipping happens in the course of the work, which can not lead to the damage of power source 31, and further extend power mechanism's using life.

When in specific use, the handle 1 is held in hand and tilted relatively, and the working wheel 2 is placed against the surface of the glass; activating the power mechanism 3 and the working wheel 2 rotates, driving the scraping piece 21 to rotate, and through the contact of the scraping piece 21 against the glass, the ice of the glass surface is scraped off. The illuminating lamp 13 can be turned on when using at night.

Embodiment 2

The difference between the embodiment 1 and the present embodiment lies in that an extension bar 4 is connected between the handle 11 and the housing 1; said handle 11 is connected to the end of the extension bar 4, which is convenient for deicing at high or distant place and more flexible in use. Other structures are identical to that of the embodiment 1, thereby no more detailed description provided herein.

Embodiment 3

In the present embodiment, said working wheel 2 is covered with a working layer on the outside. The working layer can be used for sticking hair, or for cleaning, or for removing rust, or for polishing.

The above specific embodiments are used to explain the invention, and not to limit the invention, and any modification and alteration made to the invention within the spirit of the invention and the scope of protection of the claims will fall within the scope of protection of the invention.

The invention claimed is:

1. An electric defroster, comprising
    a housing (1) with a handle (11);
    a working wheel (2) rotatably connected with the housing (1) and at least partially protrudes out of a surface of the housing (1), scraping pieces (21) extending along axial direction is arranged on the surface of the working wheel (2);
    a power mechanism (3) is used for driving the working wheel (2) to rotate relative to the housing (1); the power mechanism (3) drives the working wheel (2) to rotate relative to the housing (1); the scraping pieces (21) rotate in the circumferential direction to scrape ice;
    the power mechanism (3) comprises a power source (31), a speed reduction unit (32) connected with the output shaft of the power source (31), and a conveyor belt (33) connected with the speed reduction unit (32) and the working wheel (2).

2. The electric defroster of claim 1 wherein the working wheel (2) is cylindrical, and the scraping pieces (21) protrude outwards from the surface of the working wheel (2).

3. The electric defroster of claim 1 wherein there are a plurality of scraping pieces (21) extend spirally, and are distributed at intervals along the circumferential direction of the working wheel (2).

4. The electric defroster of claim 3 wherein the height of the scraping pieces (21) protruding from the surface of the working wheel (2) is gradually increased along the direction in which the working wheel (2) is rotated.

5. The electric defroster of claim 1 wherein the speed reduction unit (32) comprises the first speed reduction gear (321) and the second speed reduction gear (322) which are in meshing transmission; the power source (31) is a motor which is arranged in parallel with the working wheel (2).

6. The electric defroster of claim 1 wherein tooth (22) is provided on the rotation shaft of working wheel (2), said first speed reduction gear (321) is coaxially provided with a first auxiliary gear (323), said second speed reduction gear (322) is coaxially provided with a second auxiliary gear (324), wherein said first auxiliary gear (323) is in mesh transmission with the second speed reduction gear (322), and said second auxiliary gear (324) and the tooth (22) are connected by conveyor belt (33).

7. The electric defroster of claim 1 wherein on said housing (1) is provided with a protective cover (12) at the position corresponding to the working wheel (2); on said housing (1) is provided with an auxiliary illuminating lamp (13).

8. The electric defroster of claim 1 wherein said housing (1) is connected to an extension bar (4), said handle (11) is connected to the end of the extension bar (4).

9. The electric defroster of claim 1 wherein said working wheel (2) is covered with a working layer on the outside.

* * * * *